US009032434B2

(12) United States Patent
Lee et al.

(10) Patent No.: US 9,032,434 B2
(45) Date of Patent: May 12, 2015

(54) UNSUPERVISED CONTENT REPLAY IN LIVE VIDEO

(71) Applicant: Google Inc., Mountain View, CA (US)

(72) Inventors: Juhyun Lee, San Jose, CA (US); Ramesh Sarukkai, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/650,858

(22) Filed: Oct. 12, 2012

(65) Prior Publication Data

US 2015/0089520 A1  Mar. 26, 2015

(51) Int. Cl.
H04N 7/10 (2006.01)
H04N 7/025 (2006.01)
H04H 60/33 (2008.01)
H04N 21/25 (2011.01)

(52) U.S. Cl.
CPC .................................. H04N 21/251 (2013.01)

(58) Field of Classification Search
CPC .............. H04N 21/4438; H04N 21/44222; H04N 21/4532; H04N 21/466; H04N 21/4667; H04N 21/23418; H04N 21/40; H04N 21/23424; H04N 21/26241; H04N 21/2668; H04N 21/4331; H04N 21/44016; H04N 21/234; H04N 21/44
USPC ................................................ 725/9, 32–34
See application file for complete search history.

(56) References Cited

U.S. PATENT DOCUMENTS

| 7,603,682 | B1 | 10/2009 | Akiyama et al. |
| 8,196,168 | B1 | 6/2012 | Bryan et al. |
| 2002/0194592 | A1 | 12/2002 | Tsuchida et al. |
| 2003/0023972 | A1* | 1/2003 | Gutta et al. ..................... 725/34 |
| 2003/0093790 | A1 | 5/2003 | Logan et al. |
| 2005/0028188 | A1* | 2/2005 | Latona et al. ................... 725/13 |
| 2006/0225105 | A1* | 10/2006 | Russ ................................. 725/78 |
| 2008/0306807 | A1 | 12/2008 | Amento et al. |

(Continued)

FOREIGN PATENT DOCUMENTS

| EP | 2509006 A1 | 10/2012 |
| WO | WO2011009101 A1 | 1/2011 |
| WO | WO2014059078 A1 | 4/2014 |

OTHER PUBLICATIONS

Wei-Ting Peng et al: "Editing by Viewing: Automatic Home Video Summarization by Viewing Behavior Analysis". IEEE Transactions on Multimedia. IEEE Service Center. Piscataway. NJ. US. vol. 13. No. 3. Jun. 1, 2011. pp. 539-550.

(Continued)

*Primary Examiner* — Benjamin R Bruckart
*Assistant Examiner* — Akshay Doshi
(74) *Attorney, Agent, or Firm* — Lowenstein Sandler LLP

(57) ABSTRACT

Systems and methods are presented for monitoring user interest in a video as it is being played and autonomously selecting a section of the video for replaying based on an identified user interest in the section. A monitoring component monitors user interaction with a video being streamed to one or more devices as the video is played at the one or more devices. An identification component further determines level of user interest based on the monitored user interaction and identifies a section of the video associated with the level of user interest in response to the level of user interest being above a predetermined threshold. Then a replay component streams the section of the video to the one or more devices again at least in response to the identification of the section.

35 Claims, 11 Drawing Sheets

(56) References Cited

U.S. PATENT DOCUMENTS

| | | | |
|---|---|---|---|
| 2008/0320534 A1* | 12/2008 | Wang et al. | 725/100 |
| 2009/0113466 A1 | 4/2009 | Amitay | |
| 2009/0164904 A1 | 6/2009 | Horowitz et al. | |
| 2012/0179786 A1 | 7/2012 | Nandagopal | |
| 2012/0216121 A1* | 8/2012 | Lin et al. | 715/721 |
| 2012/0324491 A1* | 12/2012 | Bathiche et al. | 725/10 |

OTHER PUBLICATIONS

Search Report for PCT/US2013/064235, mailed Feb. 19, 2014.

* cited by examiner

```
                    ┌─────────────────────────────────────────┐
                    │ STREAMING A VIDEO TO ONE OR MORE DEVICES,│
           900      │ WHEREIN THE VIDEO COMPRISES A TAG       │
                    │ INDICATING A POINT IN THE VIDEO WHERE   │
                    │ AN ADVERTISEMENT IS TO BE INSERTED      │
                    │                                     902 │
                    └────────────────────┬────────────────────┘
                                         ▼
                    ┌─────────────────────────────────────────┐
                    │ MONITORING USER INTERACTION WITH THE    │
                    │ VIDEO AS THE VIDEO IS PLAYED AT THE ONE │
                    │ OR MORE DEVICES                     904 │
                    └────────────────────┬────────────────────┘
                                         ▼
                    ┌─────────────────────────────────────────┐
                    │ DETERMINING LEVEL OF USER INTEREST      │
                    │ BASED ON THE MONITORING THE USER        │
                    │ INTERACTION                         906 │
                    └────────────────────┬────────────────────┘
                                         ▼
                    ┌─────────────────────────────────────────┐
                    │ IDENTIFYING A SECTION OF THE VIDEO      │
                    │ ASSOCIATED WITH THE USER INTEREST LEVEL │
                    │ IN RESPONSE TO THE USER INTEREST LEVEL  │
                    │ BEING ABOVE A PREDETERMINED THRESHOLD   │
                    │                                     908 │
                    └────────────────────┬────────────────────┘
                                         ▼
                    ┌─────────────────────────────────────────┐
                    │ DETERMINING WHEN THE ADVERTISEMENT      │
                    │ SHOULD NOT BE INSERTED              910 │
                    └────────────────────┬────────────────────┘
                                         ▼
                    ┌─────────────────────────────────────────┐
                    │ STREAMING THE SECTION OF THE VIDEO TO   │
                    │ THE ONE OR MORE DEVICES AGAIN AT THE    │
                    │ POINT IN RESPONSE TO A DETERMINATION    │
                    │ THAT THE ADVERTISEMENT SHOULD NOT BE    │
                    │ INSERTED                            912 │
                    └─────────────────────────────────────────┘
```

FIG. 9

UNSUPERVISED CONTENT REPLAY IN LIVE VIDEO

TECHNICAL FIELD

This disclosure relates to monitoring user interest in a video as it is being played and autonomously selecting a section of the video for replaying based on an identified user interest in the section.

BACKGROUND

In live media broadcast, advertisements are generally inserted at points in live video as determined appropriate in real time by human oversight. In addition, for live video such as live streaming video, cue points are often inserted to indicate where a video advertisement should be played. For example, advertisements and/or cue points may be inserted at situations such as a time out in a sports game or when a video game player needs a bathroom break. However, for various reasons such as frequency cap on advertisements or no available advertisement content, an advertisement break may be unused. As a result, these advertisement slots may be filled with empty content such as a static screen or a static message screen if not appropriately prepared for such ads block-out occasions.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with monitoring user interest in a video as it is being played and replaying a section of the video based on an identified user interest in the section.

In accordance with a non-limiting embodiment, in an aspect, a system is provided comprising a monitoring component that monitors user interaction with a video being streamed to one or more devices as the video is played at the one or more devices. The system includes an identification component that determines level of user interest based on the monitored user interaction and identifies a section of the video associated with the level of user interest in response to the level of user interest being above a predetermined threshold. The system further includes a replay component that streams the section of the video to the one or more devices again in response to the identification of the section. In an aspect, the system also includes a streaming component that streams the video to one or more devices. The video may be being streamed to the one or more devices as a live video broadcast.

In another non-limiting embodiment, provided is a method comprising streaming a video to one or more devices and monitoring user interaction with the video as the video is played at the one or more devices. The method also comprises determining level of user interest based on the monitoring the user interaction, identifying a section of the video associated with the user interest level in response to the user interest level being above a predetermined threshold, and streaming again, the section of the video to the one or more devices for replaying of the section of the video at the one or more devices in response to the identification of the section.

In yet another non-limiting embodiment a computer-readable storage medium is provided comprising computer-readable instructions that, in response to execution, cause a computing system to perform operations comprising streaming a video to one or more devices and monitoring user interaction with the video as the video is played at the one or more devices. The operations further comprise determining level of user interest based on the monitoring the user interaction, identifying a section of the video associated with the user interest level in response to the user interest level being above a predetermined threshold, and streaming again the section of the video to the one or more devices for replaying of the section of the video at the one or more devices in response to the identification of the section.

BRIEF DESCRIPTION OF THE DRAWINGS

FIG. 9 illustrates an example methodology for replaying sections of a media item in accordance with various aspects and implementations described herein.

DETAILED DESCRIPTION

Figure 1:
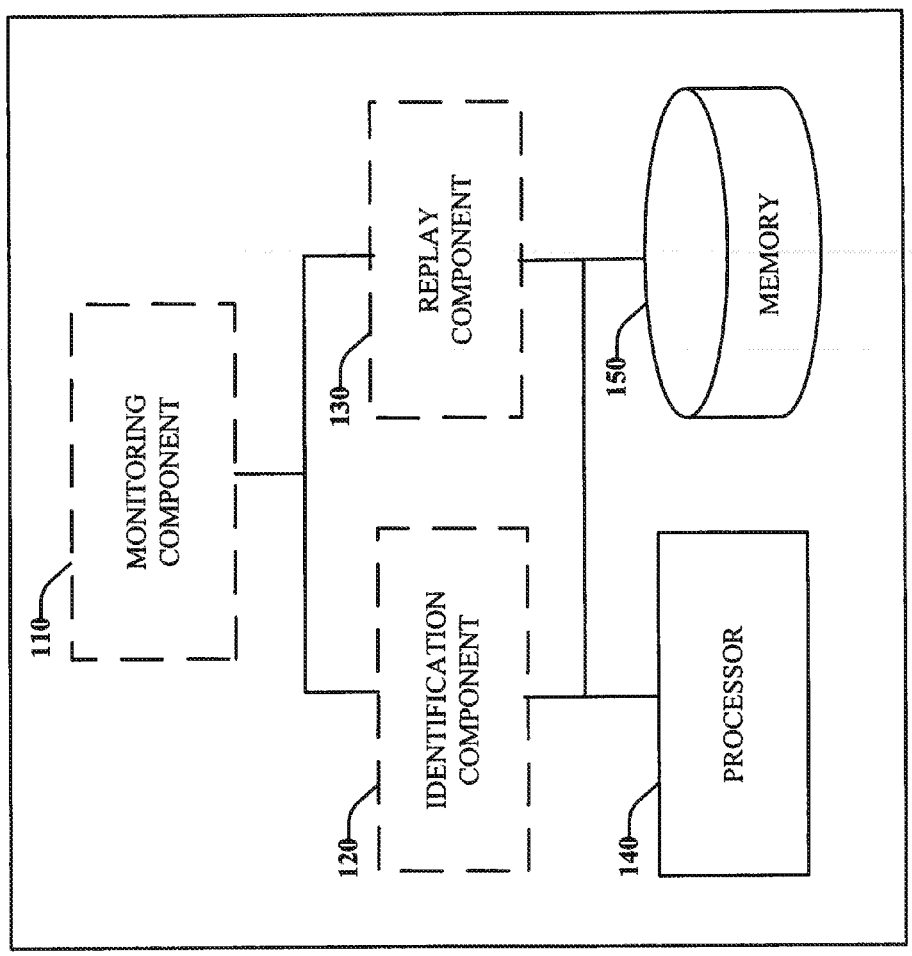
FIG. 1 illustrates an example non-limiting media replay system that facilitates replaying sections of a media item in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more embodiments or implementations described in this disclosure, users can choose not to provide personal information, demographic information, location information, proprietary information, sensitive information, or the like in connection with data gathering aspects. Moreover, one or more embodiments or implementations described herein can provide for anonymizing collected, received, or transmitted data.

Referring now to the drawings, with reference initially to FIG. 1, a media replay system 100 that facilitates replaying sections of a media item is presented. Media replay systems disclosed herein are configured to monitor one or more factors indicative of user interest in a video as it is being streamed to and played at one or more client devices. Based on the monitored factors, the system(s) are able to identify a section of the video demonstrating heightened user interest in the section. The identified section can later be extracted and/or stored for possible replaying of the section.

Aspects of the systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described. System 100 can include memory 150 for storing computer executable components and instructions. A processor 140 can facilitate operation of the computer executable components and instructions by the system 100.

In an embodiment, system 100 is associated with a streaming media provider or media content distribution network configured to stream live and non-live media content to clients. System 100 can include monitoring component 110, identification component 120, and replay component 130. In an aspect, monitoring component 110 monitors user interaction with a video being streamed to one or more devices as the video is played at the one or more devices. For example, the monitoring component 110 can monitor factors indicative of user interest in a particular section of a video, including a live video, such as user commenting on the video in real time. The identification component 120 can determine or infer level of user interest in the video based on the monitored user interaction and identify a section of the video associated with the level of user interest in response to the level of user interest being above a predetermined threshold. For example, the identification component 120 can identify a section of a live video that prompted an increase in users commenting on the section of the video or that is associated with an increase in users joining and receiving the live video stream. Such increased reactions can equate to a level of user interest that surpasses a minimum threshold, thus indicting the related section is sufficiently "interesting" to users to constitute replaying of the section. The replay component 130 further streams the identified "interesting" section of the video to the one or more devices again, at least in response to the identification of the section. For example, in the event of an interruption in a live video stream, the replay component 130 can fill the void by replaying the identified section.

As used herein, the term media content or media item can include live and non-live video data and/or audio data. Monitoring component 110 can be configured to monitor various factors indicative of user interest in media content being streamed to one or more client devices. For example, a client device may receive a live media stream (from media replay system 100 or another source) resulting in real-time or substantially real-time playing of the live media stream at the client device. In an embodiment, client devices can receive media items from a media content provider/distributor. In various embodiments, systems described herein can serve as media content provider/distributers that stream the media items to client devices.

Media items can be associated with one or more data sources and content distributors that can be accessed by a client device and/or by media replay system 100 (and additional systems described in this disclosure). For example, media items can include various types of live and non-video including but not limited to movies, television, advertisements or video games. In an aspect, a data source can include a data store storing media items and located internal to system 100. For example, memory 150 can include a data store comprising video files. According to this aspect, system 100 can be configured to provide the media items to a client device. In another aspect, a data source can include a data store storing media items and affiliated with a media content provider that streams media items to a client device and that is accessible to media replay system 100. Still in yet another aspect, a data source can include a live media content provider that can be associated with system 100 and/or accessible to system 100. For example, a data source can include a commercial broadcasting television network or a small entity broadcaster that streams live video to a client device and employs a live video content processing and distribution network.

A client device can include any suitable computing device associated with a user and configured to interact with, receive, and play media content. For example, a client device can include a desktop computer, a laptop computer, a smartphone, a tablet personal computer (PC), or a PDA. As used in this disclosure, the terms "consumer" or "user" refer to a person, entity, system, or combination thereof that employs media system 100 (or additional systems described in this disclosure) via a client device. In an aspect, a client device or media system 100 (or additional systems described in this disclosure) can be configured to access, interact with, receive, and/or play media items via a network. In an aspect, the network can include an Internet, intranet, a cellular service network, a virtual private network (VPN), a local area network (LAN), a wireless LAN (WLAN), a wide area network (WAN), a metropolitan area network (MAN), a portion of the Internet, or a combination of two or more such networks. For example, a client device may view and interact with media items (or additional systems described herein) using a browser and/or media playing software.

In an aspect, client devices receive and play media items distributed thereto using a streaming media protocol. For example, a media source or media content distributor can employ an HTTP-based media streaming communications protocol to stream media items to client devices. HTTP-based media streaming communications work by breaking the overall stream into a sequence of small HTTP-based file downloads, each download loading one short chunk of an overall potentially unbounded transport stream. For example, a media source or media content distributor can employ HTTP Live Streaming (HLS) to distribute a live video stream. In another example, a media source or media content distributor can employ smooth streaming or HTTP dynamic streaming to receive and distribute video. Additional example protocols for streaming video in particular embodiments can include but are not limited to User Datagram Protocol (UDP), Real-Time Streaming Protocol (RTSP), Real-Time Transport Protocol (RTP), Real-Time Transport Control Protocol (RTCP), and Transmission Control Protocol (TCP). Reference to a video may encompass a video stream or a section of a video and vice versa, where appropriate.

Monitoring component 110 can monitor one or more factors indicative of user interest in a section of a video being streamed and played at one or more client devices. As used herein, a section of a video includes a portion of a video less than the entire video. For example, a section of a video can include one or more frames of video. As used herein, the terms section, portion, segment or chunk of a video may be used interchangeably. User interest refers to the interest one or more users have in a particular section of a video as compared to another section of the video and/or a section of another video. In an aspect, user interest can reflect a popularity of a section of a video amongst a plurality of users. In another aspect, user interest can refer to the interest of a single viewer in a section of a video with respect to other sections of the video. Any information monitored or tracked by monitoring component 110 can be temporarily or permanently stored in memory, such as memory 150, or alternative memory accessible to identification component 120. Identification component 120 can further employ monitored information to identify video sections associated with a heightened user interest.

In an embodiment the monitoring component 110 monitors user interaction with a video being streamed to one or more devices as the video is played at the one or more devices. In an aspect, the video is being streamed to the one or more devices as a live video broadcast. User interaction with a video being streamed to a client device can encompass any suitable effect associated with a user and resulting from the playing of the video.

In an aspect, user interaction with a video being streamed to and played at one or more client devices includes user commenting on the video. In an aspect, system 100 can provide an interface for users to provide commentary about videos. According to this aspect, system 100 can receive commentary directly. In another aspect, users can provide commentary about a video using another system(s) and monitoring component 110 can receive access to such commentary at the other system(s). In an aspect, a user can provide commentary on a video in real time as the video is being played. The commentary can further be shared via a network to one or more other users. For example, a user can be associated with a community and share commentary about a video he or she is watching with the community in an instant messaging format. In another example, the user can post comments about the video he is watching to an open forum or message board in real time. In particular, an interesting situation in videos may spark user comments. For example, a user may be watching a live baseball game and choose to post a comment immediately following a homerun by a famous player, such as such as "WOW!," "Amazing Play!," or "EPIC!," and etc.

The monitoring component 110 can monitor various features associated with user commentary on a video. In an aspect, the monitoring component 110 can track the timing of user comments on a video by one or more users with respect to the video. For example, the monitoring component 110 can track a timing or frame of the video where a comment occurs. The monitoring component 110 can further monitor the number of comments made and/or the number of different users making the comments. In an aspect, the monitoring component 110 can further track information pertaining to each user making a comment, including but not limited to, an identity of the user, a location of the user, a demographic of the user, or an affiliation of the user. However, it should be appreciated that users can choose not to provide personal information in association with monitoring aspects. In addition, the monitoring component 110 can also monitor the content of comments made. For example, the monitoring component 110 can not only track and note that a comment was made, but further record the content of the comment. Accordingly, the content of comments can later be analyzed by the identification component 120.

In addition to user commentary, the monitoring component 110 can monitor other user input that reflects a user's interest in a video. For example, the monitoring component 110 can monitor user input to to a survey about the video, including user input indicating that the user likes or dislikes the video. For example, a survey can provide an option for a user to select a like or dislike button, or a thumbs up or thumbs down button with respect to a section of a video. In an aspect, system 100 can provide the survey for users to provide input about videos. According to this aspect, system 100 can generate surveys and receive commentary directly. In another aspect, users can provide survey input about a video using another system(s) and monitoring component 110 can receive access to such input at the other system(s).

In an aspect, user commentary and/or user survey input may be shared at one or more systems external to system 100. For example, a user may post comments or survey answers regarding a video to a social networking system. In another example, a user may post a link to video at an external system or share a link to a video as a multimedia message via a wireless device. Further, in response to posting information or sharing information regarding a video at an external system or device, additional comments and interest may be sparked at the external system by other users. For example, users at external systems may share or spread the posted information to additional systems or users. According to this aspect, the monitoring component 110 can further monitor the sharing of user generated information associated with a video at external systems and devices as well as responses initiated by the sharing of the user generated information at the external systems.

The monitoring component 110 can also monitor a number of devices being streamed a video at a given time. As a result, the monitoring component 110 can monitor the number of users joining and leaving a live video stream during the course of the live video stream. For example, a spike in users joining a live video stream at a particular point in the live video stream may reflect the occurrence of an interesting event at that point in the live video. Similarly, a drop in the number of users receiving the live video stream following the spike may reflect the ending of the interesting event.

In an embodiment, the monitoring component 110 can monitor user interaction with a video being streamed to a client device that includes at least one of pausing the video, re-winding the video, fast-forwarding the video, or a replaying of the video. According to this embodiment, a video can be streamed to a device in a format that allows the video to be played in real-time or substantially real-time, paused, re-played, fast-forwarded, re-winded, and shared. For example, upon receiving a video at a client device, a user of the device can employ a media player to play the first ten seconds of the video, then rewind and replay the first ten seconds, then pause the video, then jump ahead or fast-forward the video back to its current point in live time, and etc. It can be assumed for example that if a user pauses, rewinds, and replays a particular section of a video, that user is likely interested in the particular section of the video.

In another aspect, the monitoring component 110 further monitors user interaction with a device at which a video is being streamed and played. According to this aspect, user interaction with a device at which a video is streamed and played includes at least one of user physical positioning with respect to the device, user visual direction with respect to the device, or movement of the device. For example, the monitoring component 110 can monitor the location of a user with respect the device or the location of a user's hand with respect to an interfacing tool such as a mouse, keyboard or touchpad. In another example, the monitoring component 110 can monitor a user's posture, and/or direction of vision. According to this aspect, the monitoring component 110 can utilize one or more sensory devices associated with a user device to determine a user's physical presence. For example, the monitoring component 110 can utilize a camera, an acoustic sensor, an optical sensor, or a thermal sensor, that is associated with a client device.

For example, a user may be playing a video yet not be paying attention to the video because he is not even physically near their device. In another example, a user may perk up in his seat or throw his hands up in the air in response to an exciting event in a video. Similarly, for handheld or wearable devices, a user may actually cause a device to move in response to an interesting event in a video. Such a device may include a motion sensor or accelerometer to detect motion of the device. In an example, a user may shake a device out of frustration when a sports team misses a goal. The monitoring component 110 may monitor physical user movement to facilitate the identification component 120 in identifying sections of a video associated with heightened user interest.

Other physical user interaction with a device at which a video is being streamed and played can include physical user interaction with the device via an input or reception mechanism. Such user interaction can include but is not limited to, mouse movement, touch pad interaction, and/or keyboard activity effectuated by a user. For example, the monitoring component 110 can monitor usage of a pointing device, including usage resulting in movement of a mouse or cursor and clicking of a mouse or cursor. Additional input mechanisms can include user input via audio input devices, camera input devices, and other sensor reception/input devices that include but are not limited to: acoustic sensors, vibration sensors, chemical sensors, cameras, motion sensors, thermal sensors, magnetic sensors, motion sensors, optical sensors, and proximity sensors.

In an aspect, user interaction with a device at which a video is being streamed and played includes activity that results in a reaction in a graphical user interface that is direct result of a physical action by a user. For example, user interaction with a device can include movement of a cursor as a result of mouse movement, keystrokes or keyboard activity, stylus movement, finger movement with respect to a touch screen interface, or verbal/audio input commands. Still in yet another aspect, in order to detect user interaction with a device, the monitoring component 110 can monitor hardware or software interrupt signals. The monitoring component 110 is configured to monitor a variety of factors associated with user interaction with a device at which a video is being streamed and played. In particular, the monitoring component 110 can monitor timing of user interaction, frequency of user interaction, duration of user interaction, and type of user interaction.

In an embodiment the monitoring component 110 can further monitor secondary factors related to user interest in a video being streamed to and played at a client device and the identification component 120 can determine level of user interest in the video based in part on the monitored secondary factors. In an aspect, secondary factors can include at least one of: context of the device at which a video is being streamed and played, operating parameters of the device, volume of the video being played, size of a player window in which the video is being played with respect to the graphical user interface (GUI) of the device, a number of open windows in the GUI of the device, or a location of the player window with respect to other open windows in the GUI of the device.

Device context can include but is not limited the physical location of a device, other devices near a device at which media content is being played, or time of day. Secondary factors relating to device operating parameters can include but are not limited to, screen size, picture quality, and network connection efficiency. In another aspect, the monitoring component 110 can monitor the volume of the player in which media content is being played, including when the volume of the player is turned off or muted. Still in other aspects, the monitoring component 110 can monitor the size of the window of the player in which media content is being played in the graphical user interface (GUI) of the device. For example, the monitoring component 110 can monitor if a window is minimized or maximized, as well as the sizing dimensions of the window. Similarly, the monitoring component 110 can monitor the number of open windows in the GUI of the device, or the location of the player application window with respect to other open windows in the GUI of the device. For example, the monitoring component 110 can monitor whether the player application window in which media content is being played is obscured by another open window and to what degree. For example, the monitoring component may determine that a user is clapping his hands at a point in the playing of a video, yet the video player volume is muted and the video player window is minimized. As a result, the identification component 120 can determine that the hand clapping gesture was not a result of an interesting event in the video.

The identification component 120 is configured to identify sections of a video that has been or is being streamed to one or more client devices that generate a greater user interest as compared to other sections of the video. In an aspect, the identification component 120 may also identify sections of a video that has been or is being streamed to one or more client devices that generate a greater user interest as compared to sections of other videos that have been or are being streamed to one or more client devices. For example, the identification component 120 can continuously determine or infer level of user interest in a video over the course of the playing of the video. The level of user interest can reflect a degree of interest one or more users have in the video at given point or segment of a video. Accordingly, level of user interest in a video can be graphically depicted over the course of a video, with the graph showing a linear dynamic of user interest in a video.

For example, a level of user interest can reflect degree of interest one or more users have in a video from seconds 5 to 10 or from frames 8-11, based on one or more monitored factors gathered in seconds 5 to 10 or frames 8-11 respectively. In an aspect, the identification component 120 can apply a sliding window to measure user interest levels over chunks or segments of video. For example, the identification component 120 may apply monitored information gathered every N number of seconds to infer or determine a related user interest level for a window of time or a window of frames of video. According to this example, the identification component can determine or infer user interest level in a video from seconds 1-5, seconds 2-6, seconds 3-7, and so on, where the sliding window is a function of 5 seconds.

The identification component 120 can be configured to identify increases or spikes in user interest levels and apply a mechanism to identify sections of a video where the increases or spikes are substantial. It is to be appreciated that what is considered "substantial" or "interesting" by identification component 120 can be predefined by system 100 and/or inferred by system 100. For example, the identification component 120 can apply a minimum threshold for which a user interest level must surpass in order for the section of video responsible for the interest level to be considered "interesting" or "substantial." In another aspect, the identification component 120 can infer that a particular increase in user interest level with respect to a particular video section is substantial. According to this aspect, the identification component 120 can apply machine learning techniques to identify sections of a video attributable to a substantial increase in user interest level based on the influx of monitored information reflecting an increase in user interest level during the playing of a video at one or more client devices. For instance, the identification component 120 may compare user interest levels previously determined for similar videos with user interest levels of a current video. In another example, the identification component 120 can compare user interest levels determined for other live videos being streamed to client devices simultaneously or substantially simultaneously. According to this example, the identification component 120 can identify the "most exciting" event happening in live television at a given point in time, (where live television in this example refers to all live video being monitored by monitoring component 110).

In an embodiment, the identification component 120 can apply various classifiers that determine level of user interest in a video based on one or more of the features the monitoring component 110 is capable of monitoring, as described herein. System 100 can employ any suitable classification scheme to identify level of user interest. For example, system 100 may define any number N levels of interest, where a higher number reflects a higher level of interest. For instance, system 100 may define 10 levels of user interest with level 1 reflecting little or no interest and level 10 reflecting very high user interest. According to this example, the identification component 120 may determine level of user interest in a video as the video is played at one or more client devices and identify a section of the video associated with the level of user interest in response to the level of user interest being above a predetermined threshold. According to the sliding window aspect for example, from seconds 1-5, 2-6 and 3-7, the identification component may calculate a user interest level of 3 in each window respectively. However, from seconds 4-8, the identification component 120 may calculate a user interest level of 8. Where the threshold level is 7, the identification component 120 can identify a section of the video that resulted in the user interest level of 8. The section may include seconds 4-8 and/or the section may include seconds prior to seconds 4-8 and/or following seconds 4-8.

The identification component 120 can apply a variety of mechanisms in order to associate a section of a video with a determined or inferred user interest level. In an aspect, the identification component can apply a standard rule whereby the associated section of the video includes the X number of frames or X number of seconds of the video prior to a triggering interest level identification (e.g. a spike in interest level or the identification of an interest level that surpasses a predetermined), and/or X number of frames or X number of seconds following the triggering interest level. In another aspect, the identification component 120 can apply various algorithms that are configured to identify a section of video associated with a triggering interest level. Such algorithms can account for one or more of the factors for which the identified triggering interest level is based and/or the timing of the specific factors for which the triggering interest level is based. For example, an increase in user interest level may be accompanied by ongoing user comments such as "I can't believe this is happening," or "I can't watch her jump," and etc. The identification component may further analyze these comments to infer that the section of the video associated with the increase in user interest level should include content following the initial increase in user interest level. In yet another aspect, the identification component 120 can apply graphical analysis to select a section of video associated with a triggering interest level.

In an aspect, level of user interest can refer to the level of interest a single user has in a video or the level of interest collective users have in a video. For the single user case, as the user views a video (live or non-live), the identification component 120 can apply analysis calculations based on monitored factors related to a single user to determine the single user's interest level in the video as it played. For example, the identification component 120 may apply an algorithm that calculates single user interest level based on monitored user interaction with the device at which the user is playing the video and/or one or more of the secondary factors discussed herein. In response to the single user's interest surpassing a predetermined threshold, the identification component 120 can further identify sections of the video associated with the single user's interest level. The identified section can then be stored and/or replayed to the user at a later time. According to the single user case, replaying of sections of a video can thus be tailored to the individual users so that one user may be provided with replay content that is different than another user.

For collective users, the identification component 120 can identify sections of a video that reflect the collective interests of a group of users. According to this aspect, the identification component 120 can identify popular or interesting sections of a video with respect to a group of viewers. For example, as a live video is streamed to multiple users, comments received from at least some of the multiple viewers in the group at a relatively same time in the playing of the live video may indicate that many of the viewers in the group found the section of the video being played at a timeframe surrounding the comments to be interesting. The comments may reflect a level of user interest above a predetermined threshold, based on a determination or inference made by the identification component 120 as a function of the comments. For example, the level of user interest may be based on a number of comments made, a number of different users making the comments, and/or the content of the comments. As a result, the identification component 120 may identify the section of the video associated with the comments (e.g. the section of the video being played at a timeframe surrounding the comments) and the identified section can then be stored and/or replayed to one or more of the viewers in the group at a later time.

In an aspect, such a group of viewers can encompass all viewers of the video. In another aspect, such a group of viewers can include a subset of all viewers of a video. For example, the subset can restrict a group of viewers by demographic, association, location, and etc. According to this example, a user may be part of a community of friends and choose to limit decisions on video sections for replaying by system 100 to reflect the impressions and interests of only the friends in his community.

In an embodiment, the identification component 120 employs machine learning techniques in order to determine and/or infer level of user interest in a video and/or to identify a section of the video associated with the level of user interest. According to this embodiment, the identification component 120 can make inferences or determinations in connection with determining user interest level in a video and identifying a section of the video associated with the level of user interest. Such inferences can be based at least on the information monitored by monitoring component 110 and learned associations between various monitored features, user interest levels and related sections of a video.

In order to provide for or aid in the numerous inferences described in this disclosure, identification component 120 can examine the entirety or a subset of data to which it is granted access in order to provide for reasoning about user interest levels and associated sections of a video that resulted in the user interest levels. Identification component 120 can be granted access to any information associated with media system 100 (and additional system described herein), including information logged and/or monitored by system 100 (via monitoring component 110) and stored in memory 150, as well as accessible extrinsic information.

Identification component 120 can perform inferences to identify a specific context or action, or to generate a probability distribution over states, for example. The inferences can be probabilistic, that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, . . . , xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 2:
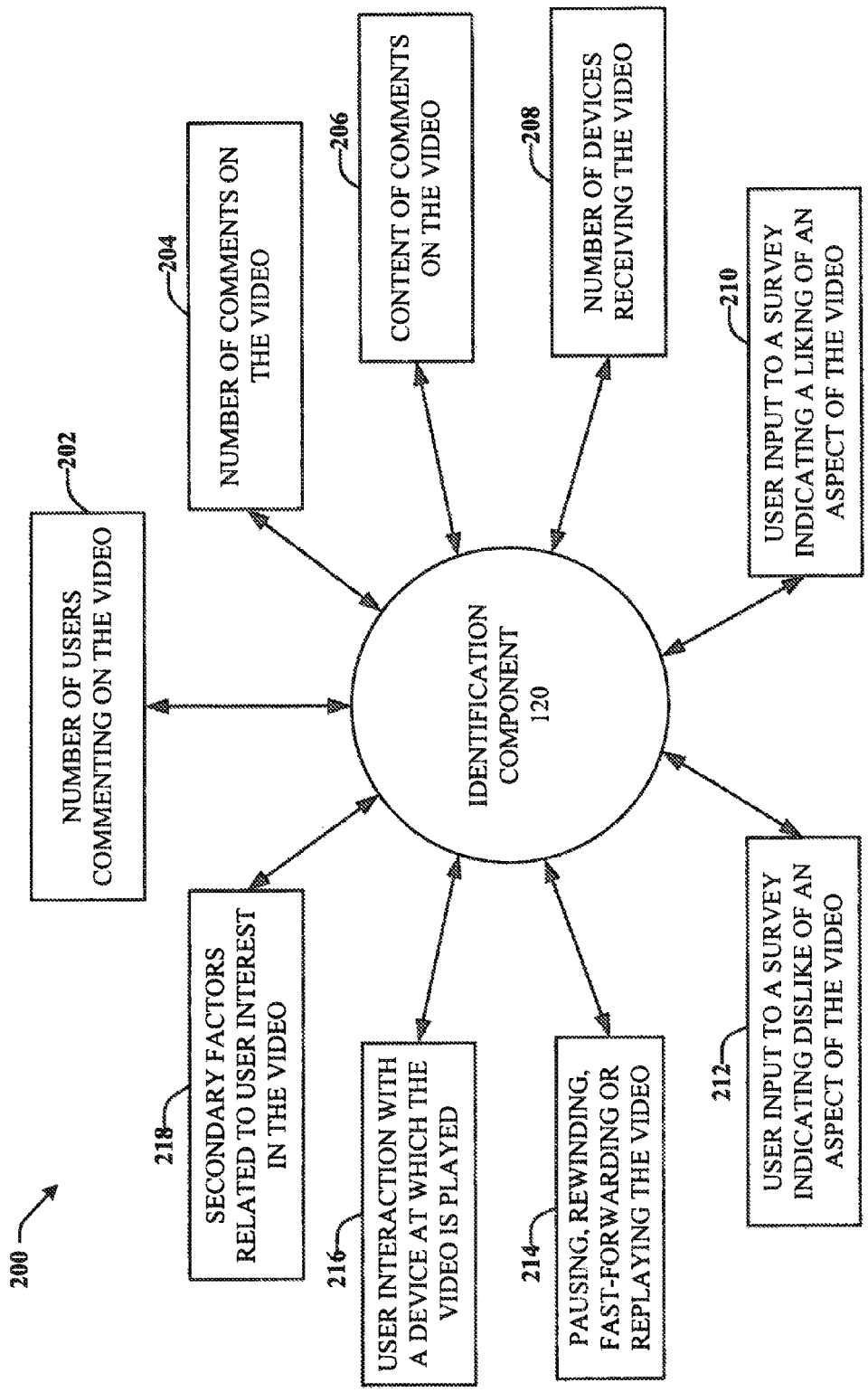
FIG. 2 illustrates an exemplary diagram representing the identification component and various factors which the identification component can base determinations and inferences regarding user interest levels in accordance with various aspects and implementations described herein.

FIG. 2 presents an exemplary diagram representing the identification component 120 and various factors 202-218 which the identification component 120 can base determinations and inferences regarding user interest levels. In an aspect, the identification component 120 can determine or infer user interest level in a video as a function of one or more of the factors represented in items 202-218. In particular, the identification component 120 may determine or infer a user interest level in a video at a given point or section (e.g. window) in the video as a function of at least one of: a number of users commenting on the video 202, a number of comments on the video 204, content of the comments on the video 206, a number of devices receiving the video 208 (e.g. number of users entering and exiting a video stream), user input to a survey indicating a liking or disliking of an aspect of the video 210/212, sharing of user input associated with the video at a social networking system 214, pausing, rewinding, fast-forwarding, or replaying the video 216, user interaction with a device at which the video is played 218, or secondary factors related to user interest in the video 220.

In an aspect, in response to identifying a triggering user interest level phenomenon, such as a level of user interest exceeding a predetermined threshold and/or a substantial increase in user interest level, the identification component 120 can further associate the triggering user interest level phenomenon with a section of the video that likely generated the triggering user interest level phenomenon. The identification component 120 can further employ various machine learning techniques and classifiers to facilitate inferring a section of a video attributable to the triggering user interest level phenomenon.

Referring back to FIG. 1, replay component 130 is configured to replay a section or a portion of a video that has been streamed to one or more client devices and identified as "interesting" by the identification component 120. In particular, the replay component 130 is configured to stream a section of a video to a client device again in response to at least identification of that section by the identification component 120. For example, the identification component 120 can identify sections of a video that generate a greater user interest as compared to other sections in the video. In an aspect, these sections can be identified as having a user interest level above a predetermined threshold.

The replay component 130 can replay such sections associated with a relatively high user interest in various capacities. In particular, the replay component 130 can be configured to automatically replay such sections that are autonomously selected by system 100 at predetermined points in the video and/or in response to predetermined events during the streaming of the video. As a result, machine based selection and insertion of replay content can be achieved.

In an aspect, replay component 130 is configured to replay an identified section of a video during the streaming of the video. For instance, in a live video such as a live streaming video, cue points are often inserted to indicate where a video advertisement should be played. For example, advertisements and/or cue points may be inserted at situations such as a time out in a sports game or when a video game player needs a bathroom break. However, for various reasons such as frequency cap on advertisements or no available advertisement content, an advertisement break may be unused. As a result these advertisement slots may be filled with empty content such as a static screen or a static message screen. Therefore, in an aspect, the replay component 130 can replay an identified "interesting" section during periods of empty content or static space occurring during the playing of the video. Accordingly, the replay component 130 can facilitate automatic or unsupervised content replay at times during the playing of a live video where a break in the streaming of the live content occurs for whatever reason.

Replay component 130 can employ a media streaming protocol to stream a video sections to client device. In an aspect, replay component 130 can employ smooth streaming or HTTP dynamic streaming to stream video section. Additional example protocols for streaming video section in particular embodiments can include but are not limited to User Datagram Protocol (UDP), Real-Time Streaming Protocol (RTSP), Real-Time Transport Protocol (RTP), Real-Time Transport Control Protocol (RTCP), and Transmission Control Protocol (TCP).

Figure 3:
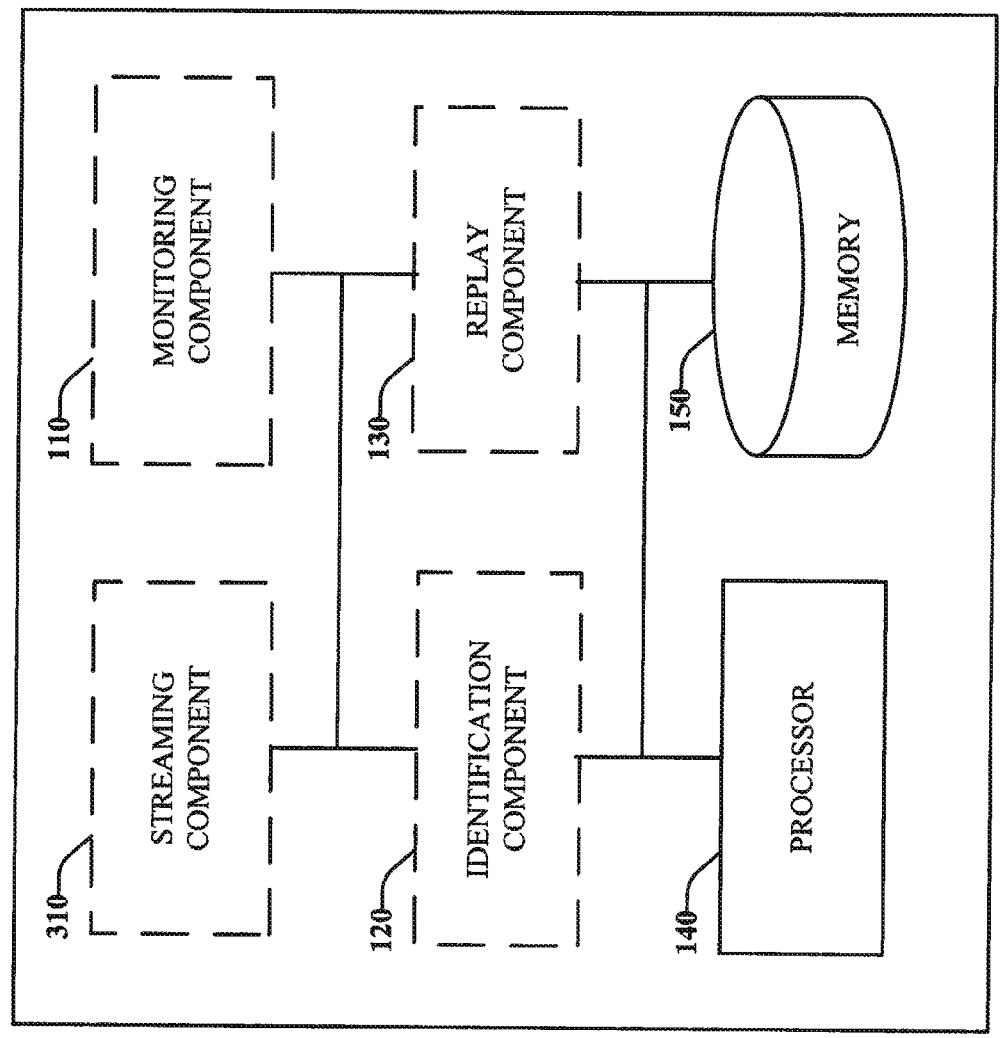
FIG. 3 illustrates an example of another non-limiting media replay system that facilitates replaying sections of a media item in accordance with various aspects and implementations described herein.

Referring now to FIG. 3, presented is another exemplary non-limiting embodiment of a media replay system 300 that facilitates replaying sections of a media item. System 300 presents an embodiment where a media replay system 300 also serves as a media content provider/distributor and provides media items to client devices. According to this embodiment, system 300 includes a streaming component 310 that streams media items, including live and non-live video, to one or more client devices. In turn, the monitoring component 110 monitors the various factors indicative of user interest in the media items and the identification component 120 identifies sections of the media items that are attributed to a relatively high user interest level for replaying by the replay component 130.

Streaming component 310 can stream video to a client device via a network, such as the Internet, an intranet, or a wireless network. In an aspect, the streaming component 310 can stream video to a client device using the same network as the replay component 130. In another aspect, the streaming component 310 can stream video to a client device using a different network than the replay component 130. In an aspect, streaming component 310 and distribute live video of a live video broadcast to a client device. In an embodiment, streaming component 310 can distribute video over a network using a streaming media protocol. For example, streaming component 110 can employ HTTP Live Streaming (HLS) to distribute live video. In another example, streaming component can employ smooth streaming or HTTP dynamic streaming to distribute video. Additional example protocols for streaming video in particular embodiments can include but are not limited to User Datagram Protocol (UDP), Real-Time Streaming Protocol (RTSP), Real-Time Transport Protocol (RTP), Real-Time Transport Control Protocol (RTCP), and Transmission Control Protocol (TCP).

Figure 4:
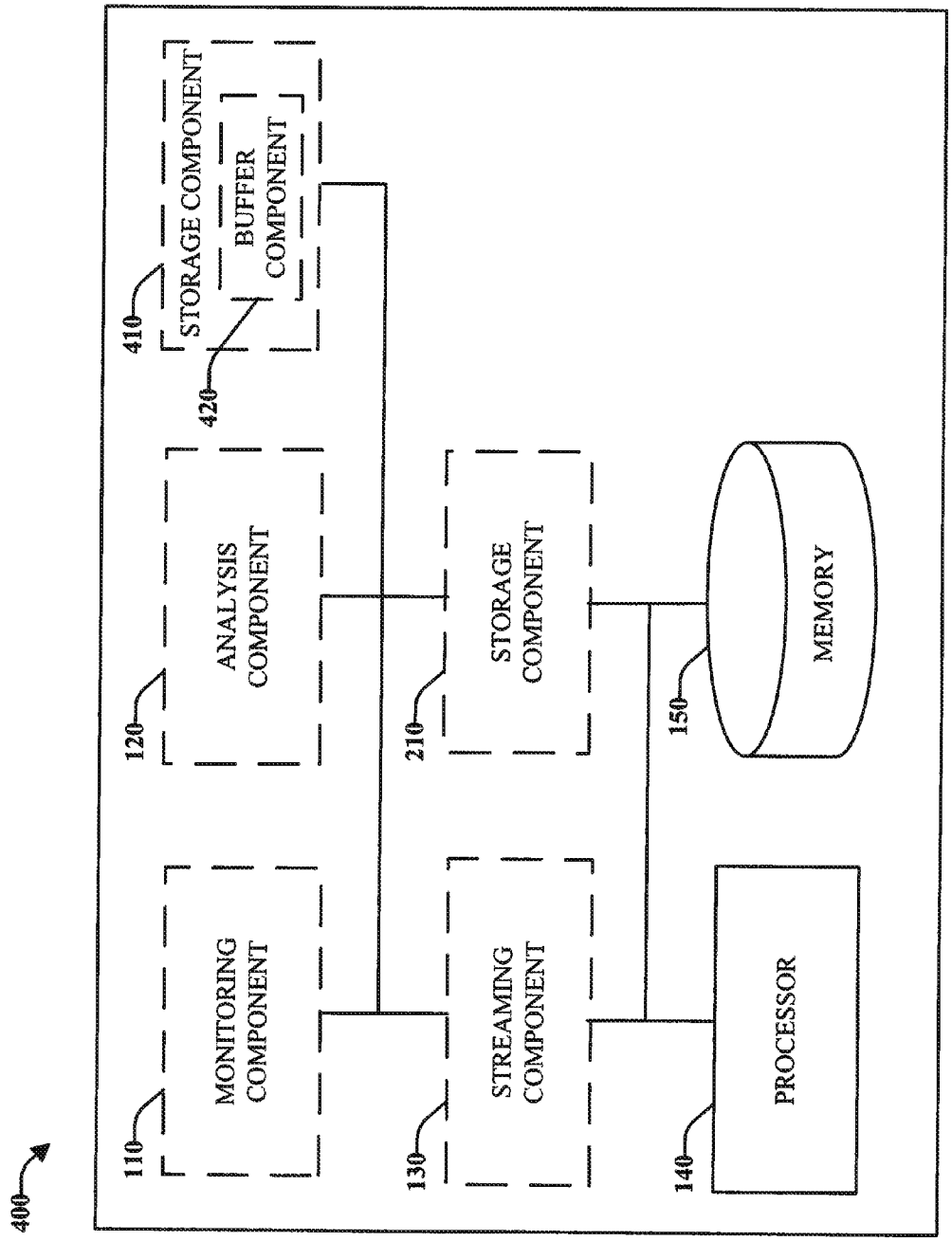
FIG. 4 illustrates an example of another non-limiting media replay system that facilitates replaying sections of a media item in accordance with various aspects and implementations described herein.

Referring now to FIG. 4 presented is another exemplary non-limiting embodiment of a media replay system 400 that facilitates replaying sections of a media item. System 400 can include storage component 410 and buffer component 420. In an aspect, storage component 410 can store sections of media items identified by identification component 120 as "interesting," in response to their identification. Accordingly, replay component 130 can replay the stored sections in the future by streaming them from the storage component 410. In another aspect, the storage component 410 may also store any portion of a video provided to a client, including the entire video. According to this aspect, the replay component 130 can extract sections identified as "interesting" by the identification component 120 from the video as stored by the storage component 410.

In an embodiment, as a live video is being streamed to a client device, the live video can be recorded and stored in buffer component 420. Buffer component 420 can be configured to temporarily store sections of live video. For example, as segments of a live video are streamed to a client device, the segments can be stored in buffer component 420. Therefore, if and when the identification component 120 identifies an "interesting" section of the live video, the identification component 120 can extract the section from the buffer component 420 and cause the section to be stored in storage component. In an aspect, following extraction of an "interesting" section, the video sections prior to and including the "interesting" section can be removed from the buffer component 420.

Figure 5:
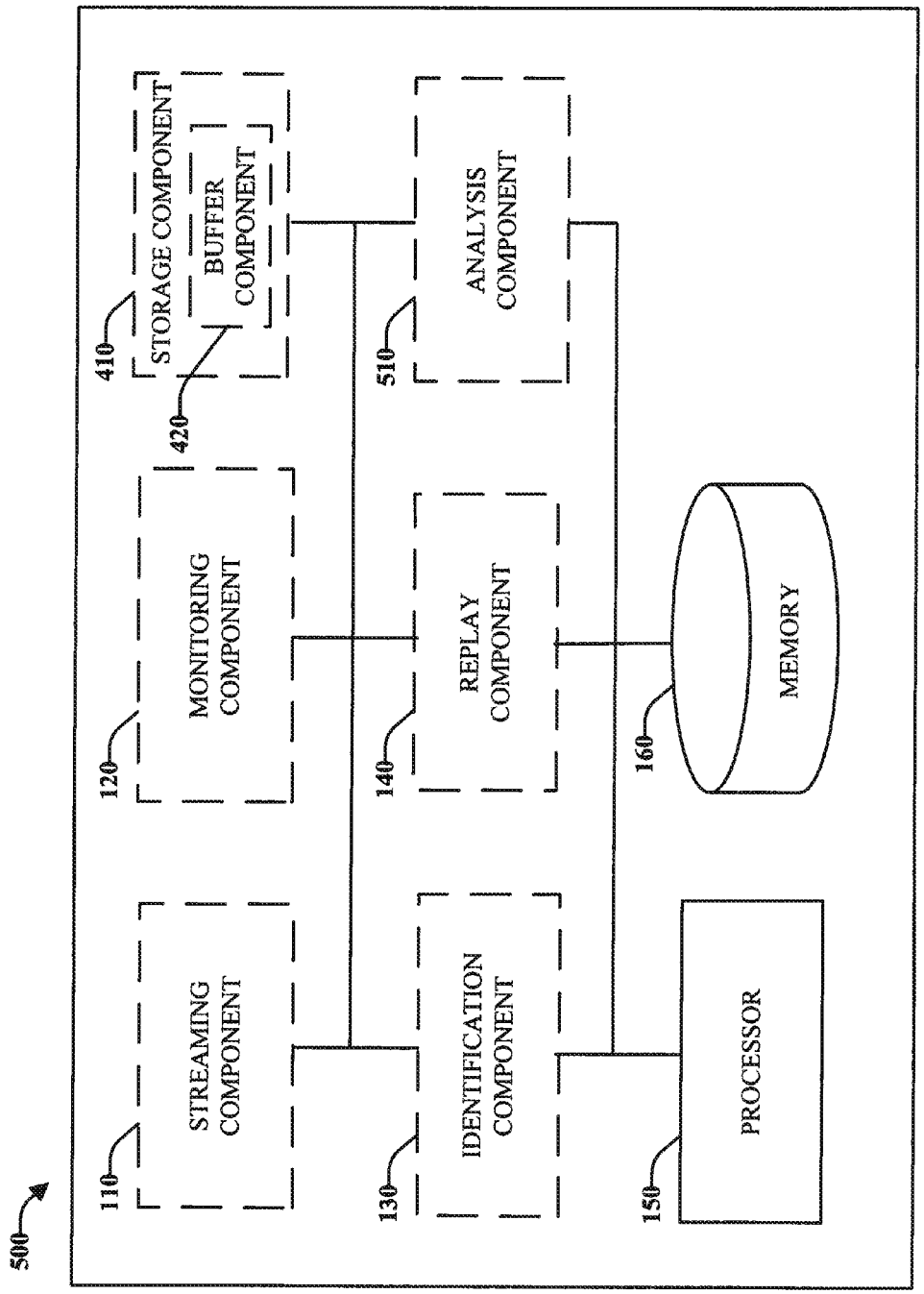
FIG. 5 illustrates an example of another non-limiting media replay system that facilitates replaying sections of a media item in accordance with various aspects and implementations described herein.

With reference to FIG. 5, presented is another exemplary non-limiting embodiment of a media replay system 500 that facilitates replaying sections of a media item. System 500 can include an analysis component 510 that facilitates the replay component 130 in determining when and where to stream an identified "interesting" section of a video again. In an embodiment, the analysis component 510 can apply predetermined protocols that define when a section of a video should be replayed during the course of the playing of a video. For example, the protocols may define that an identified "interesting" section of a live video should be replayed each time there is a break, pause, or other interruption, in the streaming and receipt of the live video at a client device.

In another embodiment, a video streamed to a client may comprise one or more tags indicating points in the video where other video content can be inserted. For example, a live video may be provided to a client device with one or more preconfigured cue point tags that signal where the replay component 130 should stream identified replay sections of the video. According to this aspect, the analysis component 510 can identify a cue point indicating that replay video content should be inserted and signal the replay component 130 to play a previously identified "interesting" section of the video again at the cue point.

In another aspect, tag in a video may indicate a point in the video where an advertisement is to be inserted. For example, advertisements cue points may be inserted at situations such as a time out in a sports game or when a video game player needs a bathroom break. However, for various reasons such as frequency cap on advertisements or no available advertisement content, an advertisement break may be unused. According to this aspect, the analysis component 510 can conduct analysis upon the identification of a tag signaling the insertion of an advertisement to determine if an advertisement should or should not be inserted. The analysis component 510 can further instruct the replay component 130 to stream a previously identified "interesting" section of the video to the client device(s) again at the tag point instead of an advertisement in response to a determination that the advertisement should not be inserted. For example, the analysis component 510 may determine that an advertisement cannot be inserted because it is not available. In another example, the analysis component 510 may determine that an advertisement cannot be inserted because protocol governing advertisement playing in the video limits the number of times advertisements can be played and the limit of times advertisements were previously played in the video has been reached.

Figure 6:
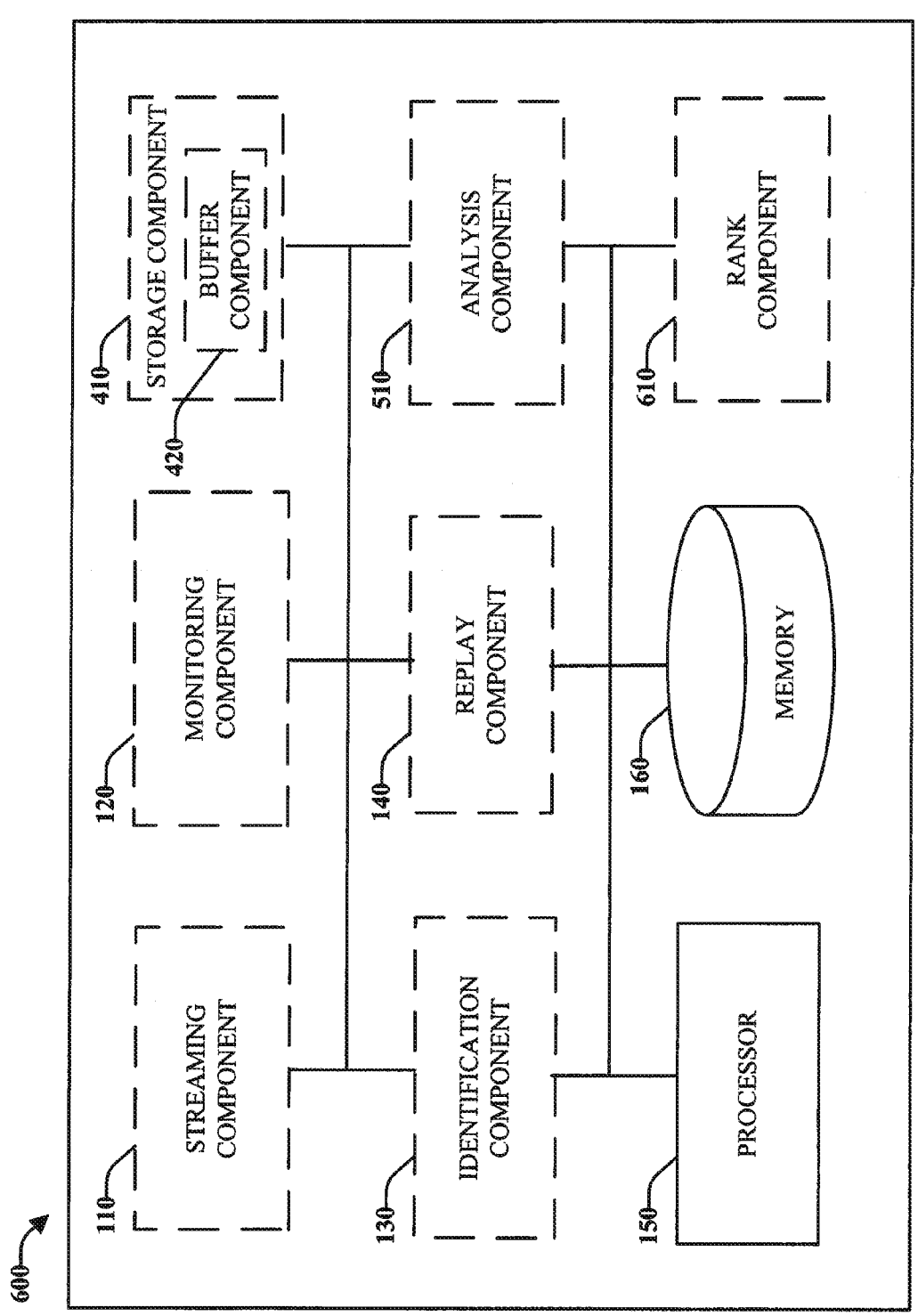
FIG. 6 illustrates an example of another non-limiting media replay system that facilitates replaying sections of a media item in accordance with various aspects and implementations described herein.

Referring now to FIG. 6, presented is another exemplary non-limiting embodiment of a media replay system 600 that facilitates replaying sections of a media item. System 600 can include rank component 610. In an aspect, the identification component 120 may identify multiple sections of a video as "interesting." According to this aspect, each time the identification component 120 identifies an interesting section, the identification component can associate that section with a user interest level. For example, the associated user interest level can be the triggering user interest level that initiated identification of the section and/or a calculated user interest level that averages the collective interests of users during the section. The identification component 120 can further store the identified sections and their associated user interest level in storage.

Rank component 610 is configured to rank two or more identified video sections according to their associated interest levels. For example, if the identification component identifies three "interesting" sections of a video, the rank component 610 can rank them from most interesting to least interesting based on their associated interest level. Accordingly, when the replay component 130 identifies a point in a video where replay content should be inserted, the replay component 130 can select the identified section having the "highest rank" relative to the other sections in storage. In an aspect, the rank component 610 can refresh stored sections of a video on a continuous or scheduled basis. For example, the rank component 610 can ensure that only a highest ranked section of video is stored in storage component 410 at a time by comparing a newly identified section with a previously identified section and replacing the previously identified section with the newly identified section only when the newly identified section outranks the previously identified section.

Figure 7:
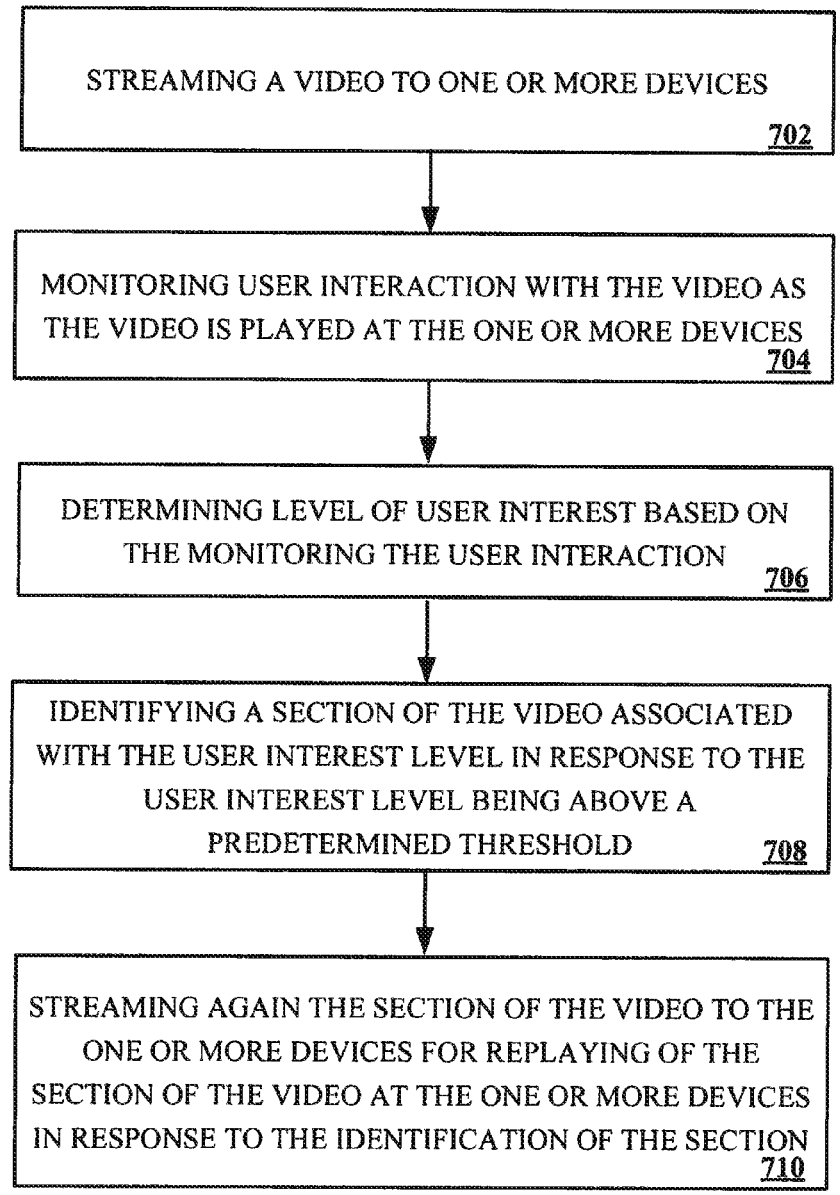
FIG. 7 illustrates an example methodology for replaying sections of a media item in accordance with various aspects and implementations described herein.
Figure 8:
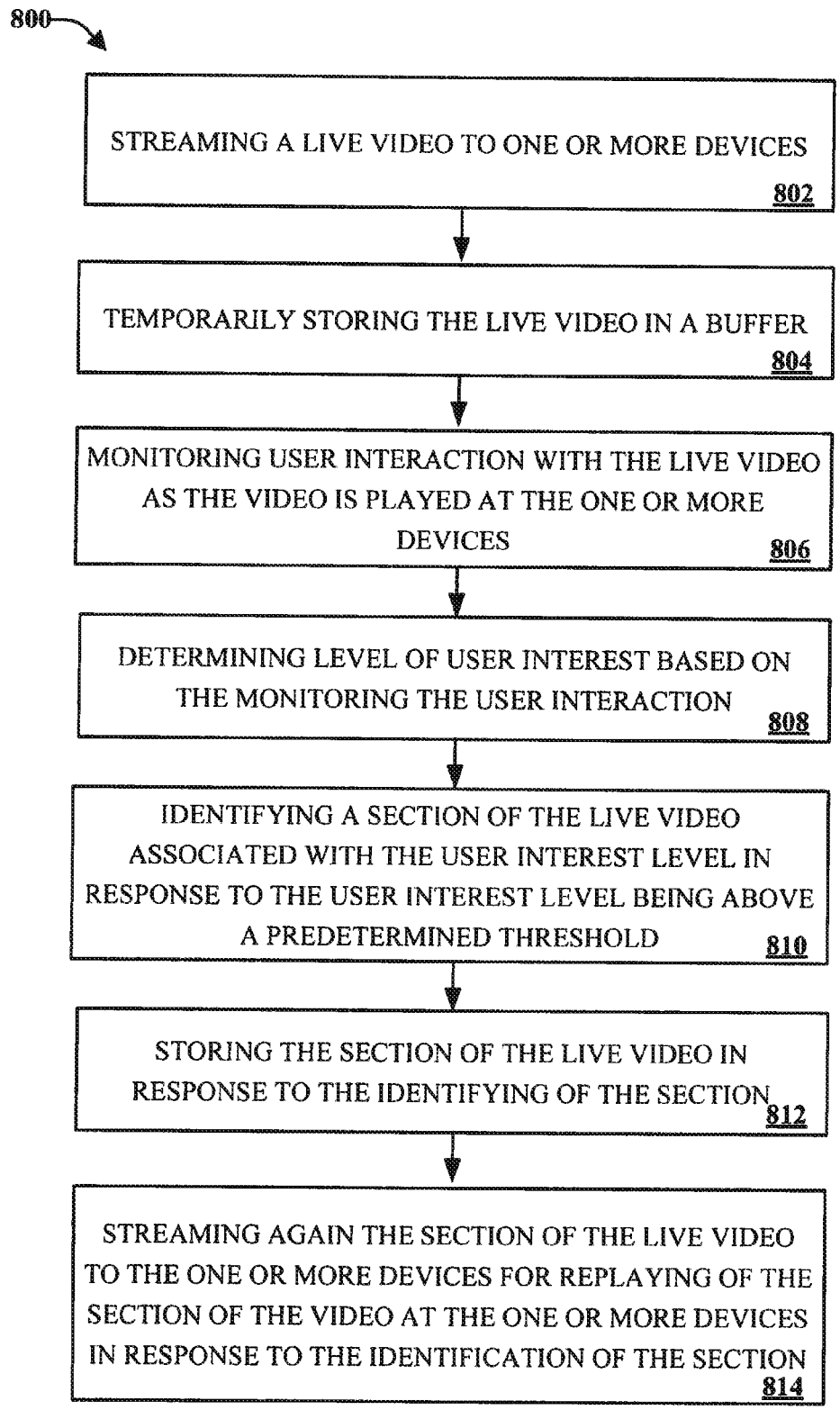
FIG. 8 illustrates another example methodology for replaying sections of a media item in accordance with various aspects and implementations described herein.

FIGS. 7-9 illustrate methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, presented is a flow diagram of an example application of systems disclosed in this description accordance with an embodiment. In an aspect, exemplary methodology 700, a media replay system is stored in a memory and utilizes a processor to execute computer executable instructions to perform functions. At 702 a video is streamed to one or more devices (e.g. using streaming component 310). At 704, user interaction with the video is monitored as the video is played at the one or more devices (e.g. using monitoring component 110). At 706, the level of user interest is determined based on the monitored user interaction (e.g. using the identification component 120). At 708, a section of the video associated with the user interest level is identified in response to the user interest level being above a predetermined threshold (e.g. using the identification component 120). Then at 710, the identified section of the video is streamed to the one or more devices again at least in response to the identification of the section (e.g. using replay component 130).

Referring now to FIG. 8, presented is another flow diagram of an example application of systems disclosed in this description accordance with an embodiment. In an aspect, exemplary methodology 800, a media replay system is stored in a memory and utilizes a processor to execute computer executable instructions to perform functions. At 802 a live video is streamed to one or more devices (e.g. using streaming component 310). At 804, the live video is temporarily stored in a buffer (e.g. using buffer component 420). At 806, user interaction with the live video is monitored as the live video is played at the one or more devices (e.g. using monitoring component 110). At 808, the level of user interest is determined based on the monitored user interaction (e.g. using the identification component 120). At 810, a section of the live video associated with the user interest level is identified in response to the user interest level being above a predetermined threshold (e.g. using the identification component 120). At 812, the section of the live video is stored in response to the identifying of the section (e.g. using storage component 410). Then at 810, the identified section of the live video is streamed to the one or more devices again at least in response to the identification of the section (e.g. using replay component 130).

Referring now to FIG. 9, presented is a flow diagram of an example application of systems disclosed in this description accordance with an embodiment. In an aspect, exemplary methodology 900, a media replay system is stored in a memory and utilizes a processor to execute computer executable instructions to perform functions. At 902 a video is streamed to one or more devices, wherein the video comprises a tag indicating a point in the video where an advertisement is to be inserted (e.g. using streaming component 310). At 904, user interaction with the video is monitored as the video is played at the one or more devices (e.g. using monitoring component 110). At 906, level of user interest is determined based on the monitored user interaction (e.g. using the identification component 120). At 908, a section of the video associated with the user interest level is identified in response to the user interest level being above a predetermined threshold (e.g. using the identification component 120). At 910, it is determined when the advertisement should not be inserted (e.g. using analysis component). Then at 912, the identified section of the video is streamed to the one or more devices again at the point in response to a determination that the advertisement should not be inserted (e.g. using replay component 130).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
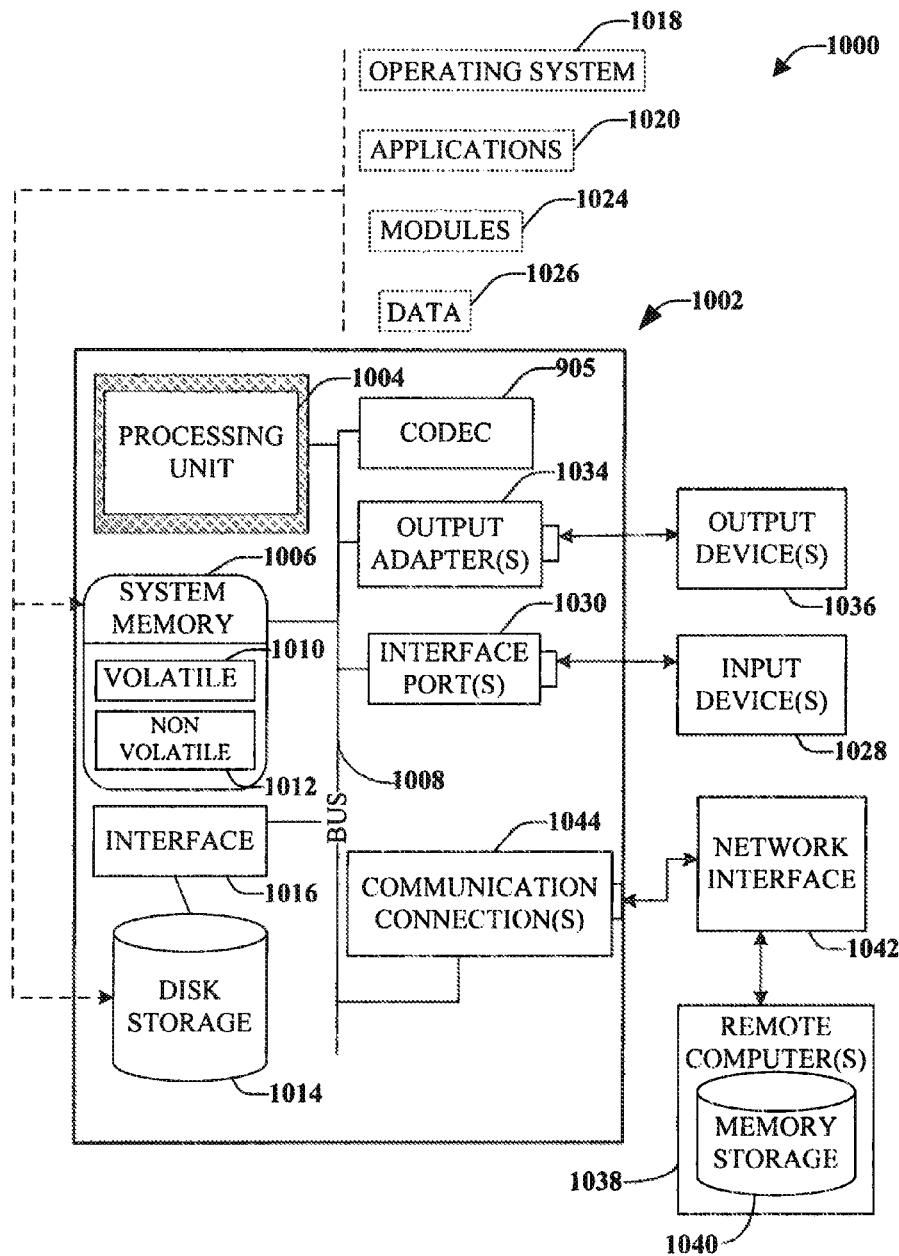
FIG. 10 is a block diagram representing an exemplary non-limiting networked environment in which various embodiments can be implemented in accordance with various aspects and implementations described herein.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. It is to be appreciated that the computer 1002 can be employed to implement one or more of the systems or components shown or described herein in connection with FIGS. 1-6. In an aspect, processing unit 1004 and system memory 1006 can represent processor 140 and memory 150 respectively. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 718 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
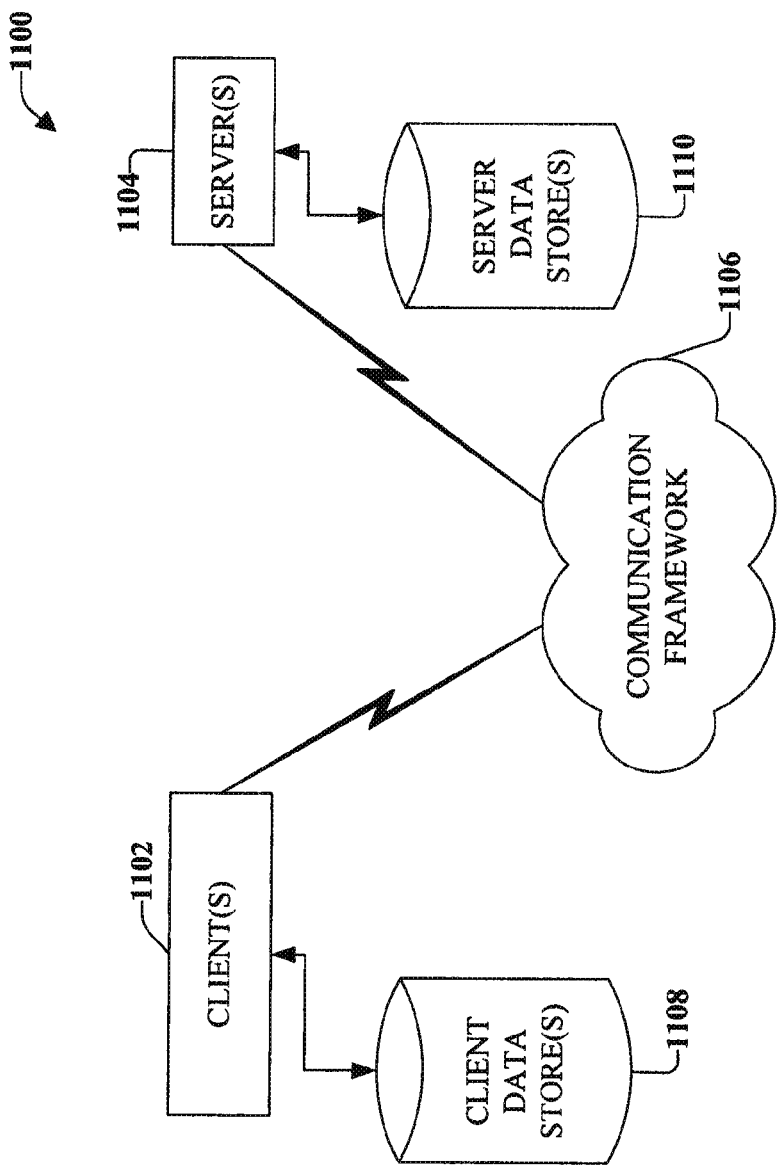
FIG. 11 is a block diagram representing an exemplary non-limiting computing system or operating environment in which various embodiments may be implemented in accordance with various aspects and implementations described herein.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). System 1100 can for example be employed in connection with implementing one or more of the systems or component described herein show in FIGS. 1 and 3-6. The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
   at least one memory to store instructions; and
   one or more processors to execute the instructions to:
      monitor user interaction with a video being streamed to one or more devices, wherein the video comprises a tag indicating a point in the video for insertion of an advertisement;
      determine a level of user interest corresponding to an event in the video based on the monitored user interaction;
      identify a section of the video associated with the event in response to the level of user interest being above a predetermined threshold;
      determine that the advertisement should not be inserted at the point in the video; and
      stream the section of the video to a device again for replaying of the section of the video at the point in the video in response to the identification of the section and the determination that the advertisement should not be inserted at the point in the video.

2. The system of claim 1, wherein the processors are further to stream the video to the devices.

3. The system of claim 1, wherein the processors are to stream the video to the devices as a live video broadcast.

4. The system of claim 1, wherein the processors are to determine that the advertisement should not be inserted at the point in the video as a function of availability of the advertisement.

5. The system of claim 1, wherein the processors are to determine that the advertisement should not be inserted at the point in the video as a function of a number of times advertisements were previously inserted in the video.

6. The system of claim 1, wherein the user interaction with the video comprises user commenting on the video.

7. The system of claim 1, wherein the user interaction with the video comprises a number of devices being streamed the video.

8. The system of claim 1, wherein the user interaction with the video comprises a survey about the video, and wherein the survey comprises user input indicating that a user likes or dislikes the video.

9. The system of claim 1, wherein the user interaction with the video comprises sharing of user input associated with the video at a social networking system.

10. The system of claim 1, wherein the user interaction with the video comprises at least one of pausing the video, re-winding the video, fast-forwarding the video, or a replaying of the video.

11. The system of claim 1, wherein the processors are further to monitor user interaction with the devices at which the video is played, wherein the processors are to determine the level of user interest based on the monitored user interaction with the devices at which the video is played, and wherein the user interaction with the devices at which the video is played comprises at least one of: user physical positioning with respect to the devices, user visual direction with respect to the devices, or movement of the devices.

12. The system of claim 1, wherein the processors are further to monitor secondary factors related to user interest in the video, wherein the processors are to determine the level of user interest based on the monitored secondary factors, and wherein the secondary factors comprise at least one of: context of the devices, operating parameters of the devices, volume of the video, size of a player window in which the video is being played with respect to graphical user interfaces of the devices, a number of open windows in the graphical user interfaces of the devices, or a location of the player window with respect to other open windows in the graphical user interfaces of the devices.

13. The system of claim 1, wherein the processors are to determine the level of user interest via machine learning.

14. The system of claim 1, wherein the processors are further to:
determine multiple levels of user interest corresponding to multiple events in the video based on the monitored user interaction, wherein the levels of user interest comprise the level of user interest, and wherein the events comprise the event;
identify multiple sections of the video associated with the events in response to the levels of user interest being above the predetermined threshold, wherein the sections comprise the section; and
rank the sections of the video based on the corresponding levels of user interest, wherein the processors are to stream the section of the video further in response to the determination that the level of interest of the section is a highest level of user interest among the levels of user interest.

15. The system of claim 3, wherein the processors are further to:
temporarily store the live video broadcast; and
store the section of the video in response to the identification of the section.

16. The system of claim 6, wherein the processors are to determine the level of user interest based on at least one of a number of users commenting on the video, a number of comments on the video, or content of the comments.

17. The system of claim 7, wherein the processors are to determine the level of user interest based on an increase or decrease in the number of devices being streamed the video.

18. A method comprising:
monitoring user interaction with a video being streamed to one or more devices, wherein the video comprises a tag indicating a point in the video for insertion of an advertisement;
determining a level of user interest corresponding to an event in the video based on monitoring the user interaction;
identifying, by one or more processors, a section of the video associated with the event in response to the level of user interest being above a predetermined threshold;
determining that the advertisement should not be inserted at the point in the video; and
streaming the section of the video to a device again for replaying of the section of the video at the point in the video in response to identifying the section and determining that the advertisement should not be inserted at the point in the video.

19. The method of claim 18, further comprising streaming the video to the devices as a live video broadcast.

20. The method of claim 18, further comprising streaming the video to the devices.

21. The method of claim 18, wherein the user interaction with the video comprises sharing of user input associated with the video at a social networking system.

22. The method of claim 18, wherein determining that the advertisement should not be inserted at the point in the video comprises determining that the advertisement should not be inserted at the point in the video as a function of availability of the advertisement.

23. The method of claim 18, wherein determining that the advertisement should not be inserted at the point in the video comprises determining that the advertisement should not be inserted at the point in the video as a function of a number of times advertisements were previously inserted in the video.

24. The method of claim 18, wherein the user interaction with the video comprises user commenting on the video.

25. The method of claim 18, wherein the user interaction with the video comprises a number of devices being streamed the video.

26. The method of claim 18, wherein the user interaction with the video comprises a survey about the video, and wherein the survey comprises user input indicating that a user likes or dislikes the video.

27. The method of claim 18, wherein the user interaction with the video comprises at least one of pausing the video, re-winding the video, fast-forwarding the video, or a replaying of the video.

28. The method of claim 18, further comprising monitoring user interaction with the devices at which the video is played, wherein determining the level of user interest comprises determining the level of user interest based on monitoring the user interaction with the devices at which the video is played, and wherein the user interaction with the devices at which the video is played comprises at least one of: user physical positioning with respect to the devices, user visual direction with respect to the devices, or movement of the devices.

29. The method of claim 18, further comprising monitoring secondary factors related to user interest in the video, wherein determining the level of user interest comprises determining the level of user interest based on monitoring the secondary factors, and wherein the secondary factors comprise at least one of: context of the devices, operating parameters of the devices, volume of the video, size of a player window in which the video is being played with respect to graphical user interfaces of the devices, a number of open windows in the graphical user interfaces of the devices, or a location of the player window with respect to other open windows in the graphical user interfaces of the devices.

30. The method of claim 18, wherein determining the level of user interest comprises determining the level of user interest via machine learning.

31. The method of claim 18, further comprising:
determining multiple levels of user interest corresponding to multiple events in the video based on monitoring the user interaction, wherein the levels of user interest comprise the level of user interest, and wherein the events comprise the event;

identifying multiple sections of the video associated with the events in response to the levels of user interest being above the predetermined threshold, wherein the sections comprise the section; and ranking the sections of the video based on the corresponding levels of user interest, wherein steaming the section of the video is further in response to determining that the level of interest of the section is a highest level of user interest among the levels of user interest.

32. The method of claim 19, further comprising:
temporarily storing the live video broadcast; and
storing the section of the video in response to identifying the section.

33. The method of claim 24, wherein determining the level of user interest comprises determining the level of user interest based on at least one of a number of users commenting on the video, a number of comments on the video, or content of the comments.

34. The method of claim 25, wherein determining the level of user interest comprises determining the level of user interest based on an increase or decrease in the number of devices being streamed the video.

35. A non-transitory computer-readable storage medium having instructions stored therein that, when executed by one or more processors, cause the processors to perform operations comprising:

monitoring user interaction with a video being streamed to one or more devices, wherein the video comprises a tag indicating a point in the video for insertion of an advertisement;

determining a level of user interest corresponding to an event in the video based on monitoring the user interaction;

identifying, by the processors, a section of the video associated with the event in response to the level of user interest being above a predetermined threshold;

determining that the advertisement should not be inserted at the point in the video; and streaming the section of the video to a device again for replaying of the section of the video at the point in the video in response to identifying the section and determining that the advertisement should not be inserted at the point in the video.

* * * * *